United States Patent
Shi et al.

(10) Patent No.: US 9,612,038 B2
(45) Date of Patent: Apr. 4, 2017

(54) METHOD FOR MANUFACTURING ALL-GLASS SOLAR COLLECTOR TUBE WITHOUT EXHAUST TAIL TUBE

(71) Applicant: GUANGZHOU INSTITUTE OF ENERGY CONVERSION, CHINESE ACADEMY OF SCIENCES, Guangzhou, Guangdong (CN)

(72) Inventors: Jifu Shi, Guangzhou (CN); Gang Xu, Guangdong (CN); Leilei Wang, Guangzhou (CN); Hualin Huang, Guangdong (CN); Naisheng Hou, Guangzhou (CN)

(73) Assignee: GUANGZHOU INSTITUTE OF ENERGY CONVERSION, CHINESE ACADEMY ACADEMY OF SCIENCES, Guangzhou (CN)

( * ) Notice: Subject to any disclaimer, the term of this patent is extended or adjusted under 35 U.S.C. 154(b) by 0 days.

(21) Appl. No.: 14/785,373

(22) PCT Filed: May 27, 2013

(86) PCT No.: PCT/CN2013/076270
§ 371 (c)(1),
(2) Date: Oct. 19, 2015

(87) PCT Pub. No.: WO2014/172950
PCT Pub. Date: Oct. 30, 2014

(65) Prior Publication Data
US 2016/0069591 A1   Mar. 10, 2016

(30) Foreign Application Priority Data

Apr. 23, 2013  (CN) .......................... 2013 1 0143408

(51) Int. Cl.
*F24J 2/05* (2006.01)
*F24J 2/50* (2006.01)
(Continued)

(52) U.S. Cl.
CPC ............... *F24J 2/055* (2013.01); *C03B 23/09* (2013.01); *C03B 23/13* (2013.01); *C03B 23/207* (2013.01);
(Continued)

(58) Field of Classification Search
CPC ....... C03B 23/217; C03B 23/09; C03B 23/13; C03B 23/207; F24J 2/055; F24J 2/507
See application file for complete search history.

(56) References Cited

U.S. PATENT DOCUMENTS 4,827,905 A * 5/1989 Takeuchi ................. F24J 2/055
126/652
4,834,066 A * 5/1989 Collins .................... F24J 2/055
126/654

FOREIGN PATENT DOCUMENTS

CN    1050763 A    4/1991
CN    2439650 Y    7/2001
(Continued)

OTHER PUBLICATIONS

Abstract for JP-58055645, Azuma et al. Apr. 2, 1983.*
International Search Report dated Sep. 26, 2013, issued in counterpart Application No. PCT/CN2013/076270 (3 pages).

*Primary Examiner* — Queenie Dehghan
(74) *Attorney, Agent, or Firm* — Westerman, Hattori, Daniels & Adrian, LLP

(57) ABSTRACT

A method for manufacturing an all-glass solar heat collecting tube without a tail pipe. The bottom of one end of an inner glass tube plated by a selective absorbing coating layer is rounded, the other end is connected to a first glass outer tube. The bottom of one end of a second glass outer tube is
(Continued)

rounded and the other end is flared. The connected inner glass tube/first glass outer tube is inserted into the second glass outer tube. A gap is formed between the first glass outer tube and the second glass outer tube to serve as an air exhausting channel. The first glass outer tube is inserted into the flared opening of the second glass outer tube. The contact point between the first glass outer tube and the second glass outer tube is heated to frit seal and butt joint.

1 Claim, 2 Drawing Sheets

(51) Int. Cl.
    *C03B 23/09*      (2006.01)
    *C03B 23/13*      (2006.01)
    *C03B 23/217*      (2006.01)
    *C03B 23/207*      (2006.01)

(52) U.S. Cl.
    CPC ............. *C03B 23/217* (2013.01); *F24J 2/507* (2013.01); *Y02E 10/44* (2013.01); *Y02P 40/57* (2015.11)

(56) References Cited

FOREIGN PATENT DOCUMENTS

| | | | |
|---|---|---|---|
| CN | 201181120 Y | | 1/2009 |
| CN | 101893335 A | | 11/2010 |
| CN | 102287939 A | | 12/2011 |
| CN | 202440421 U | | 9/2012 |
| CN | 102878711 A | | 1/2013 |
| JP | 56-168057 A | | 12/1981 |
| JP | 57-60140 A | | 4/1982 |
| JP | 58055645 A | * | 4/1983 |
| JP | 59-77251 A | | 5/1984 |
| JP | 59-77252 A | | 5/1984 |

* cited by examiner

METHOD FOR MANUFACTURING ALL-GLASS SOLAR COLLECTOR TUBE WITHOUT EXHAUST TAIL TUBE

FIELD OF THE INVENTION

The present invention belongs to the technical field of solar thermal utilization, and particularly relates to an all-glass solar collector tube without an exhaust tail tube.

BACKGROUND OF THE INVENTION

In a variety of solar energy utilization manners, photo-thermal utilization is to directly convert solar energy into thermal energy, and due to the relatively high conversion efficiency, has been promoted and applied widely. At present, an all-glass solar collector tube is the most common photothermal utilization technology, and includes an all-glass vacuum tube and an all-glass heat tube type collector tube. At present, in a manufacturing process of the all-glass vacuum tube and the all-glass heat tube type collector tube, an exhaust glass tail tube generally needs to be sealed on an outer tube in advance, and the glass tube is vacuumized and exhausted through the tail tube. However, in an application process, this glass tube is very likely to be damaged even if a protective cap is provided, resulting in vacuum leakage. Meanwhile, the beauty of the product is affected by the presence of the tail tube. Therefore, how to process an all-glass solar collector tube without an exhaust tail tube is a challenge faced by the industry, which directly limits the upgrade and update of products.

SUMMARY OF THE INVENTION

The object of the present invention is to solve the technical problems in the prior art and provide a method for manufacturing an all-glass solar collector tube without a tail tube.

To achieve the above object, the present invention adopts the following technical solutions:

First Technical Solution a method for manufacturing an all-glass solar collector tube without an exhaust tail tube includes the following steps:

(a) rounding the bottom of one end of an inner glass tube plated with selective absorption coating, and sealing a first outer glass tube on the other end thereof, wherein the length of the first outer glass tube is not larger than the length of the inner glass tube;

(b) rounding the bottom of one end of a second outer glass tube, and flaring the other end thereof;

(c) inserting the inner glass tube sealed with the first outer glass tube into the second outer glass tube;

(d) abutting joint, sealing and vacuumizing an exhaust groove of an exhaust platform and the flaring site of the second outer glass tube, to form a gap between the first outer glass tube and the second outer glass tribe to serve as an exhaust passage;

(e) after vacuumizing and exhausting, propelling the first outer glass tube by means of a mechanical device in the exhaust groove to insert the first outer glass tube into the flared opening of the second outer glass tube, wherein the first outer glass tube is in contact with the second outer glass tube;

(f) heating the contact point of the first outer glass tube and the second outer glass tube to achieve the frit seal and butt joint of the first outer glass tube and the second outer glass tube.

Second Technical Solution a method for manufacturing an all-glass solar collector tube without an exhaust tail tube includes the following steps:

(a) rounding the bottom of one end of an inner glass tube plated with selective absorption coating, sealing a first outer glass tube on the other end thereof, wherein the length of the first outer glass tube is not larger than the length of the inner glass tube, and flaring the other end of the first outer glass tube;

(b) rounding the bottom of one end of a second outer glass tube;

(c) inserting the inner glass tube sealed with the first outer glass tube into the second outer glass tube;

(d) abutting joint, sealing and vacuumizing an exhaust groove of an exhaust platform and the flared opening of the first outer glass tube, to form a gap between the first outer glass tube and the second outer glass tube to serve as an exhaust passage;

(e) after vacuumizing and exhausting, propelling the second outer glass tube by means of a mechanical device in the exhaust groove to insert the second outer glass tube into the flared opening of the first outer glass tube, wherein the first outer glass tube is in contact with the second outer glass tube;

(f) heating the contact point of the first outer glass tube and the second outer glass tube to achieve the frit seal and butt joint of the first outer glass tube and the second outer glass tube.

Third Technical Solution in a technical solution of an all-glass solar collector tube, a method for manufacturing an all-glass solar collector tube without an exhaust tail tube includes the following steps:

(a) frit sealing a third outer glass tube on an inner glass tube;

(b) rounding the bottom of one side close to the frit sealing site of the inner glass tube, vacuumizing, and filling liquid and sealing the other side thereof to obtain a glass heat tube;

(c) plating selective absorption coating on an evaporation segment of the inner glass tube;

(d) inserting the evaporation segment of the glass heat tube into a fourth outer glass tube, rounding the bottom of one end of the fourth outer glass tube, and flaring the other end thereof;

(e) butting joint and sealing the flaring site of the outer glass tube and an exhaust groove to exhaust, wherein at this time, a gap is reserved between the third outer glass tube and the fourth outer glass tube to serve as an exhaust passage;

(f) after vacuumizing and exhausting, propelling a condensation segment of the inner glass tube by means of a mechanical device in the exhaust groove to insert the third outer glass tube into the flared opening of the fourth outer glass tube, wherein the third outer glass tube is in contact with the fourth outer glass tube;

(g) heating the contact point to achieve the frit it seal and butt joint of the third outer glass tube and the fourth outer glass tube.

No exhaust tail tube can be seen on the all-glass solar collector tube obtained by the above-mentioned two solutions in appearance.

The above-mentioned solutions are used for solving a key problem in the industry, which will absolutely promote the breakthrough of the all-glass solar collector tube from product appearance to processing technology.

Since the exhaust tail tube does not need to be welded on this all-glass solar collector tube without exhaust tail tube, the production efficiency can be improved, the production cost can be lowered, and meanwhile the beauty of the product can be increased.

The present invention has the advantages that:

(1) the tail tube welding process is reduced to improve the production efficiency;

(2) since no tail rube is welded, the product safety is improved and the service life is prolonged;

(3) the appearance of the product is improved, and thus the product is easy to promote and apply.

DETAILED DESCRIPTION OF THE EMBODIMENTS

A further detailed illustration on contents of the present invention will be given below in combination with specific embodiments and the accompanying drawings, but the protection scope of the present invention is not merely limited to the following embodiments, and any technical solutions equivalent to the contents of the present invention belong to the protection scope of the present patent.

First Embodiment

Figure 1:
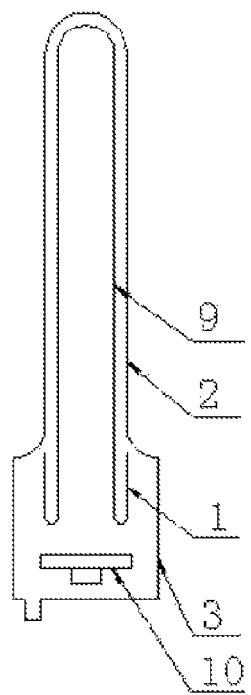
FIG. 1 is a schematic diagram of a flaring exhaust structure of a second outer glass tube 2 in a first embodiment.

Referring to FIG. 1, a method for manufacturing an all-glass solar collector tube without an exhaust tail tube includes the following steps:

(a) rounding the bottom of one end of an inner glass tube 9 plated with selective absorption coating, and sealing a first outer glass tube 1 on the other end thereof, wherein the length of the first outer glass tube 1 is not larger than the length of the inner glass tube 9;

(b) rounding the bottom of one end of a second outer glass tube 2, and flaring the other end thereof;

(c) inserting the inner glass tube 9 sealed with the first outer glass rube 1 into the second outer glass tube 2;

(d) abutting joint, sealing and vacuumizing an exhaust groove 3 of an exhaust platform and the flaring site of the second outer glass tube 2, to form a gap between the first outer glass tube 1 and the second outer glass tube 2 to serve as an exhaust passage;

(e) after vacuumizing and exhausting (when vacuumizing to lower than $10^{-2}$Pa), propelling the first outer glass tube 1 by means of a mechanical device 10 in the exhaust groove 3 to insert the first outer glass tube into the flared opening of the second outer glass tube 2, wherein the first outer glass tube 1 is in contact with the second outer glass tube 2;

(f) heating the contact point of the first outer glass tube 1 and the second outer glass tube 2 to achieve the frit seal and butt joint of the first outer glass tube 1 and the second outer glass tube 2.

Second Embodiment

Figure 2:
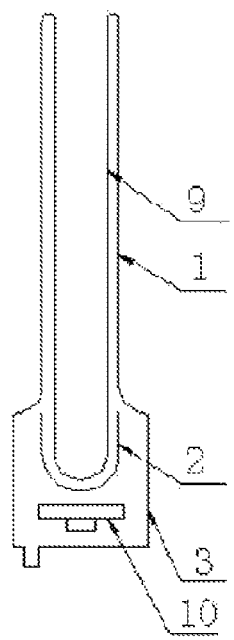
FIG. 2 is a schematic diagram of a flaring exhaust structure of a first outer glass tube 1 in a second embodiment.

Referring to FIG. 2, a method for manufacturing an all-glass solar collector tube without an exhaust tail tube includes the following steps:

(a) rounding the bottom of one end of an inner glass tube 9 plated with selective absorption coating, sealing a first outer glass tube 1 on the other end thereof, wherein the length of the first outer glass tube 1 is not larger than the length of the inner glass tube, and flaring the other end of the first outer glass tube 1;

(b) rounding the bottom of one end of a second outer glass tube 2;

(c) inserting the inner glass tube 9 sealed with the first outer glass tube 1 into the second outer glass tube 2;

(d) abutting joint, sealing and vacuumizing an exhaust groove 3 of an exhaust platform and the flared opening of the first outer glass tube 1, to form a gap between the first outer glass tube 1 and the second outer glass tube 2 to serve as an exhaust passage;

(e) after vacuumizing and exhausting, propelling the second outer glass tube 2 by means of a mechanical device 10 in the exhaust groove 3 to insert the second outer glass tube into the flared opening of the first outer glass tube 1, wherein the first outer glass tube 1 is in contact with the second outer glass tube 2;

(f) heating the contact point of the first outer glass tube 1 and the second outer glass tube 2 to achieve the frit seal and butt joint of the first outer glass tube 1 and the second outer glass tithe 2.

Third Embodiment

Figure 3:
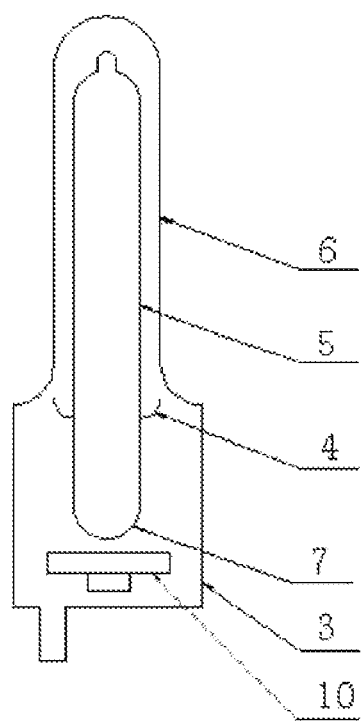
FIG. 3 is a schematic diagram of a structure of an all-glass heat tube type collector tube in a third embodiment.

Referring to FIG. 3, a method for manufacturing an all-glass solar collector tube without an exhaust tail tube includes the following steps:

(a) frit sealing a third outer glass tube on an inner glass tube 4;

(b) rounding the bottom of one side close to the frit sealing site of the inner glass tube, vacuumizing, and filling liquid and sealing the other side thereof to obtain a glass heat tube;

(c) plating selective absorption coating on an evaporation segment 5 of the inner glass tube;

(d) inserting the evaporation segment 5 of the glass heat tube into a fourth outer glass tube 6, rounding the bottom of one end of the fourth outer glass tube 6, and flaring the other end thereof;

(e) butting joint and sealing the flaring site of the outer glass tube 6 and an exhaust groove to exhaust, wherein at this time, a gap is reserved between the third outer glass tube 4 and the fourth outer glass tube 6 to serve as an exhaust passage;

(f) after vacuumizing and exhausting, propelling a condensation segment 7 of the inner glass tube by means of a mechanical device 10 in the exhaust groove 3 to insert the third outer glass tube 4 into the flared opening of the fourth outer glass tube 6, wherein the third outer glass tube 4 is in contact with the fourth outer glass tube 6;

(g) heating the contact point of the third outer glass tube 4 and the fourth outer glass tube 6 to achieve the frit seal and butt joint of the third outer glass tube 4 and the fourth outer glass tube 6.

The invention claimed is:

1. A method for manufacturing an all-glass solar collector tube without an exhaust tail tube, comprising the steps of:

rounding a bottom of one end of an inner glass tube plated with a selective absorption coating, and sealing a first outer glass tube on the other end thereof, wherein a length of the first outer glass tube is not larger than a length of the inner glass tube;

rounding a bottom of end of a second outer glass tube, and flaring the other end thereof;

inserting the inner glass tube sealed with the first outer glass tube into the second outer glass tube;

abutting joint, sealing and vacuumizing an exhaust groove of an exhaust platform and a flaring site of the second outer glass tube, to form a gap between the first outer glass tube and the second outer glass tube to serve as an exhaust passage;

after vacuumizing and exhausting, propelling the first outer glass tube using a mechanical device in the exhaust groove to insert the first outer glass tube into a flared opening of the second outer glass tube, wherein the first outer glass tube is in contact with the second outer glass tube;

heating a contact point of the first outer glass tube and the second outer glass tube to achieve a frit seal and butt joint of the first outer glass tube and the second outer glass tube.

* * * * *